(12) United States Patent
O'Neal et al.

(10) Patent No.: US 11,315,203 B1
(45) Date of Patent: *Apr. 26, 2022

(54) COMPUTER IMPLEMENTED METHOD, SYSTEM, AND NON-TRANSITORY COMPUTER-READABLE DATA STORAGE MEDIUM FOR INFORMATION DISPLAY AND ANALYSIS

(71) Applicant: Wells Fargo Bank, N.A., San Francisco, CA (US)

(72) Inventors: Rod O'Neal, Oakland, CA (US); Richard Charette, Charlotte, NC (US); Stuart Rehfuss, Charlotte, NC (US); Julie Lane, North Brunswick, NJ (US); Judy Cantor, North Brunswick, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,297

(22) Filed: Oct. 6, 2020

Related U.S. Application Data

(63) Continuation of application No. 15/354,398, filed on Nov. 17, 2016, now Pat. No. 10,853,895.

(60) Provisional application No. 62/258,214, filed on Nov. 20, 2015.

(51) Int. Cl.
*G06Q 30/00* (2012.01)
*G06Q 50/16* (2012.01)
*G06Q 30/06* (2012.01)
*G06Q 40/02* (2012.01)

(52) U.S. Cl.
CPC ......... *G06Q 50/16* (2013.01); *G06Q 30/0627* (2013.01); *G06Q 40/025* (2013.01)

(58) Field of Classification Search
CPC ... G06Q 50/16; G06Q 30/0627; G06Q 40/025
USPC ...................................... 705/26.63
See application file for complete search history.

(56) References Cited

U.S. PATENT DOCUMENTS

| | | | |
|---|---|---|---|
| 5,995,947 A | 11/1999 | Fraser et al. | |
| 7,818,254 B1 | 10/2010 | Ma | |
| 8,688,594 B2 | 4/2014 | Thomas et al. | |
| 2004/0002915 A1 | 1/2004 | McDonald | |
| 2005/0278249 A1 | 12/2005 | Jones et al. | |

(Continued)

OTHER PUBLICATIONS

VintageHomes.net launches the first internet listing system for savvy online home buyers searching southern california's neighborhoods for the american "vintage" home; . . . (May 17, 2004). Business Wire Retrieved from https://search.proquest.com/docview/445679925?accountid=14753 (Year: 2004).*

(Continued)

*Primary Examiner* — Michelle T Kringen
*Assistant Examiner* — Arielle E Weiner
(74) *Attorney, Agent, or Firm* — Merchant & Gould P.C.

(57) ABSTRACT

Information analysis and display systems and methods include receiving first financial information regarding a user, and calculating a target home price based on the received financial information. A user interface display is generated that displays the target home price, and modifications to the target home price from the user are received via the user interface. Homes for sale are evaluated based on the target price.

20 Claims, 15 Drawing Sheets

(56) References Cited

U.S. PATENT DOCUMENTS

| | | | |
|---|---|---|---|
| 2008/0015890 A1* | 1/2008 | Malyala | G06Q 50/16 |
| | | | 705/313 |
| 2008/0103964 A1* | 5/2008 | McDonald | G06Q 40/00 |
| | | | 705/38 |
| 2010/0145821 A1* | 6/2010 | Callow | G06Q 30/0241 |
| | | | 705/26.1 |
| 2011/0196762 A1* | 8/2011 | DuPont | G06Q 30/0278 |
| | | | 705/27.1 |
| 2012/0158573 A1 | 6/2012 | Crocker | |
| 2012/0246024 A1* | 9/2012 | Thomas | G06Q 50/16 |
| | | | 705/26.41 |
| 2015/0269264 A1* | 9/2015 | Bolen | G06Q 30/0627 |
| | | | 705/26.63 |

OTHER PUBLICATIONS

How to Use a Mortgage Calculators, http://www.homebuyinginstitute.com/calculators.php, 4 pages (Copyright 2015).
Mortgage Pre-Approval vs. Pre-Qualification, https://www.discover.com/home-loans/articles/mortgage-preapproval-vs-prequalification, 5 pages (Copyright 2016).
Four Comfort Zone, https://www.libro.ca/Calculators/Comfort.aspx, 3 pages (Date Downloaded Feb. 16, 2017).
VintageHomes.net launches the first internet listing system for savvy online home buyers searching southern california's neighborhoods for the american "vintage" home; . . . (2004, May 17). Business Wire Retrieved from https://search.proquest.com/docview/445679925?accountid=14753 (Year: 2004).
http://www.jimryanmortgage.com/id.html, archived Oct. 25, 2015 by the Internet Wayback Machine, accessed from https://webarchiveorg/web/20150925034807/http:/fwww_jimryanmortgage.com/id.html.

* cited by examiner

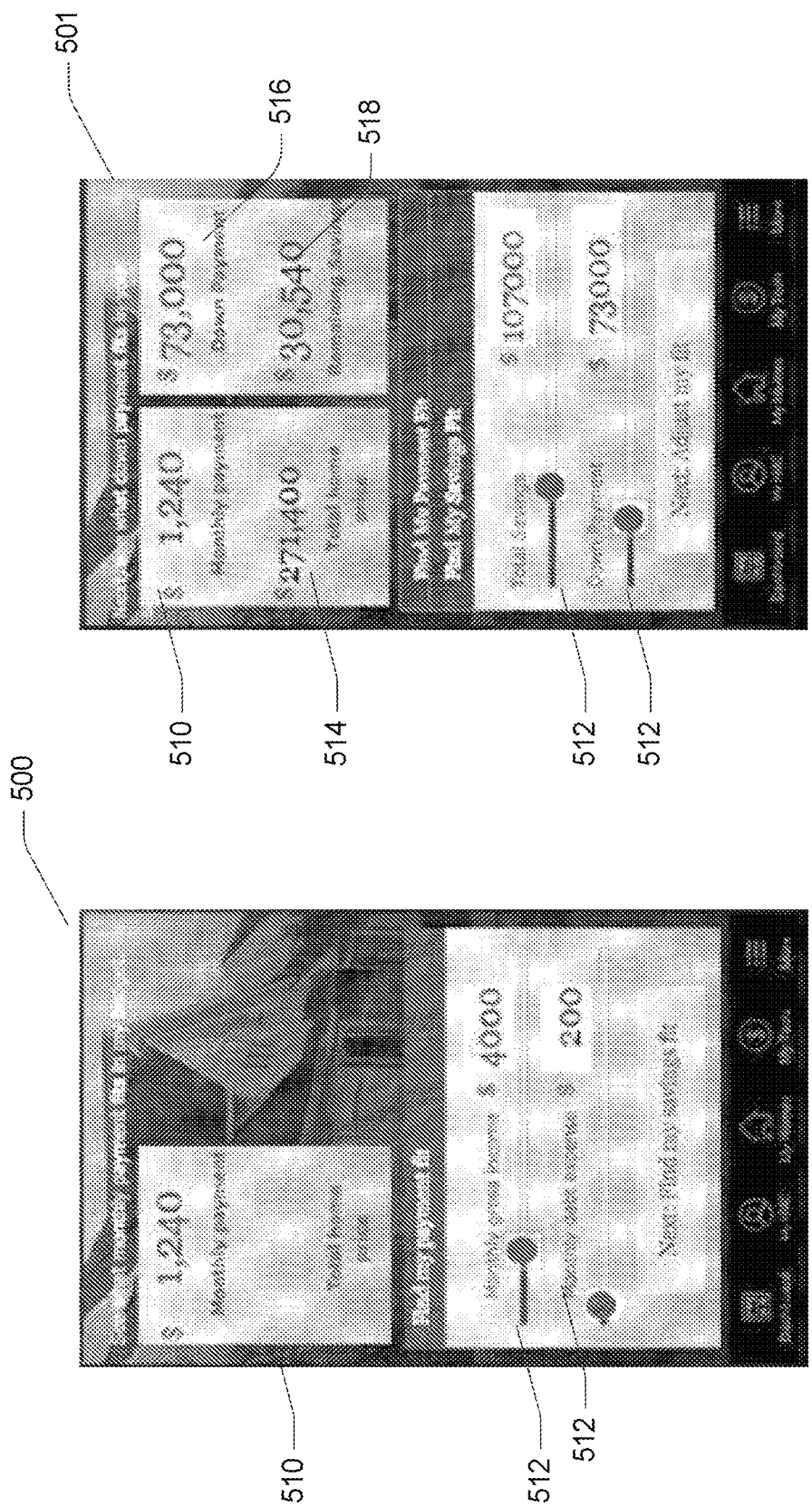

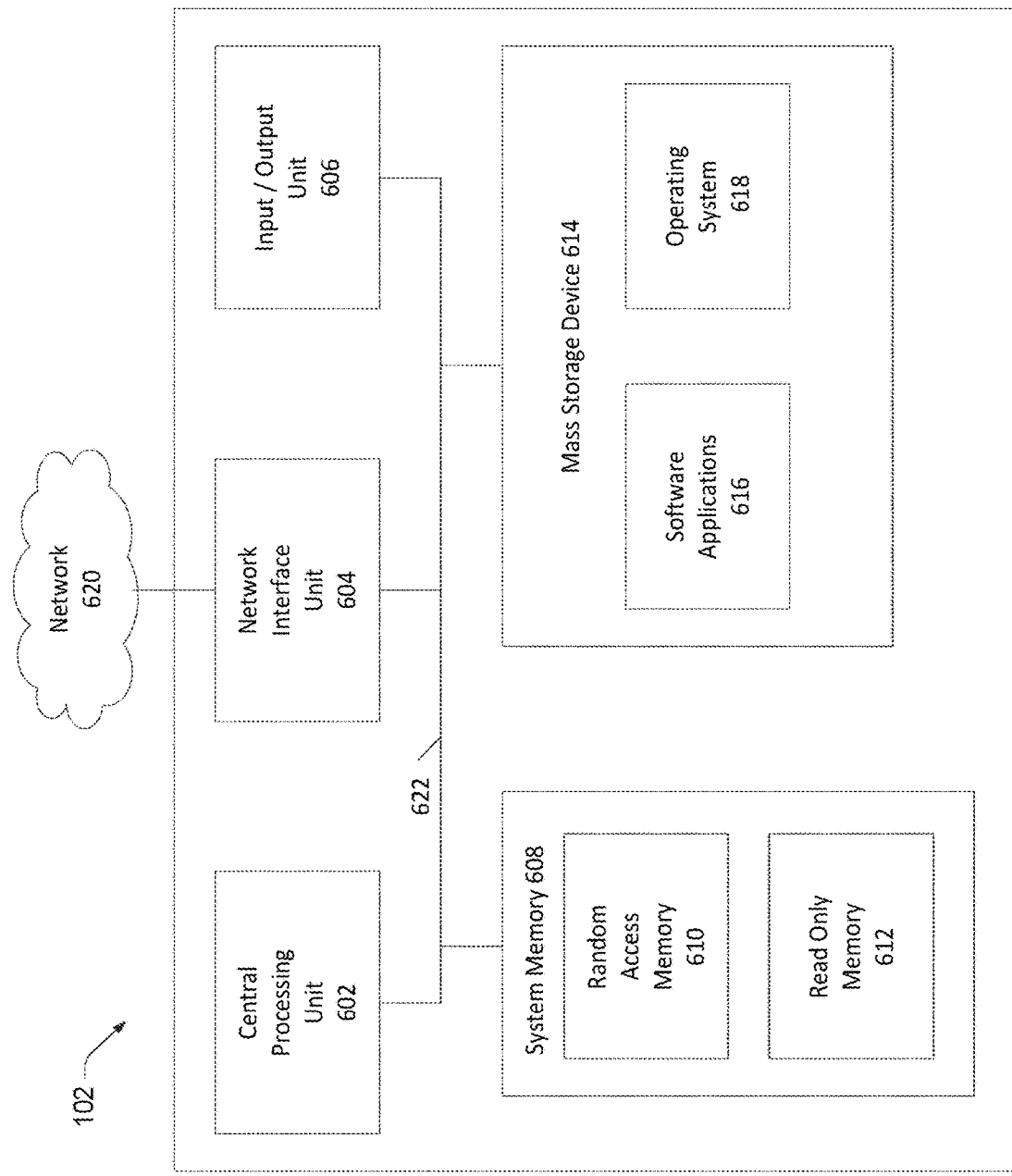

COMPUTER IMPLEMENTED METHOD, SYSTEM, AND NON-TRANSITORY COMPUTER-READABLE DATA STORAGE MEDIUM FOR INFORMATION DISPLAY AND ANALYSIS

CROSS REFERENCE TO RELATED APPLICATIONS

This application claims the benefit of U.S. Provisional Application No. 62/258,214, filed Nov. 20, 2015, and titled "Information Display and Analysis," the disclosure of which is hereby incorporated herein by reference.

BACKGROUND

Buying a home is often one of the biggest financial transactions in a person's life. Finding a home that meets all of a buyer's needs and wants can be very complicated and difficult. Financial transactions associated with home buying such as home loans or home refinances are often complex. Thus, finding and financing a home that fits a buyer's financial can be a daunting task.

Existing tools to assist home buyers include web-based desktop and mobile applications. Various web sites allow searching of for-sale homes along with the seller's asking price. Some financial institutions provide a home loan "preapproval," which refers to statement from a lender or potential lender stating the lender's preliminary determination that a borrower would qualify for a particular loan amount under the lender's guidelines, pending further information regarding a specific sale. This gives the potential purchaser information as to what he or she could afford to purchase, for example, prior to formally applying for a loan to buy a specific property.

Existing home purchasing tools such as a seller's asking price or a loan preapproval amount, however, often do not provide enough information for a potential buyer to do an adequate affordability analysis for a home purchasing decision.

SUMMARY

In accordance with aspects of the present disclosure, information analysis and display systems and methods are provided. In some embodiments, a computing system is configured to access a memory storage medium that stores instructions that, when executed by the computing system execute various information and analysis processes, examples of which are disclosed herein. In some examples, first financial information regarding a user is received, and a target home price is calculated based on the first financial information. A first user interface display is generated that displays the target home price, and modifications to the target price from the user are received via the first user interface to create a target price. The first user interface is displayed on a user device such as a smartphone in some disclosed examples. Homes for sale are evaluated based on the target price.

In some examples, the first financial information is received from a user, for example, via a user interface displayed on a mobile device. One or more databases may be accessed to receive the first financial information, which may include information from a financial institution.

DESCRIPTION OF THE DRAWINGS

FIG. 16 illustrates an example of a target price estimator user interface display generated and displayed by the system illustrated in FIG. 1.

FIG. 17 illustrates another example of a target price estimator user interface display generated and displayed by the system illustrated in FIG. 1.

FIG. 25 is a block diagram illustrating portions of an example computer system.

DETAILED DESCRIPTION

Figure 1:
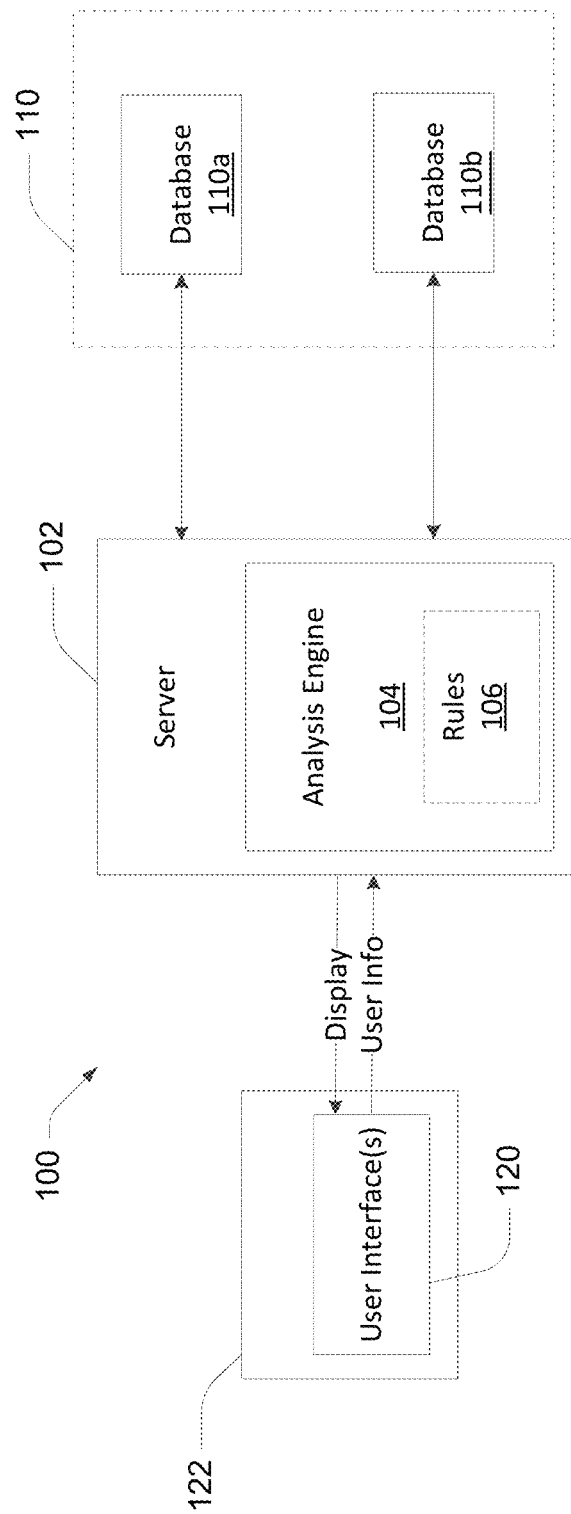
FIG. 1 is a block diagram illustrating an example of an information analysis and display system in accordance with aspects of the present disclosure.

In the following Detailed Description, reference is made to the accompanying drawings, which form a part hereof, and in which is shown by way of illustration specific embodiments in which the invention may be practiced. The following detailed description, therefore, is not to be taken in a limiting sense.

Many factors go into a home buying decision. When choosing a home to buy, buyers consider, for example, geography, size and type of dwelling, and of course cost and affordability. Many tools exist to assist buyers in their search for a home. Various home locating web sites and applications allow searching for a home based on preferences such as location, school district, list price, etc. However, this may not sufficient information for the potential buyer to make a decision based on affordability of a home. For instance, many factors determine the buyer's eventual monthly payment.

Some financial institutions provide a home loan "preapproval," which refers to statement from a lender or potential lender stating the lender's preliminary determination that a borrower would qualify for a particular loan amount under the lender's guidelines, pending further information regarding a specific sale. This gives the potential purchaser information as to what he or she could afford to purchase, for example, prior to formally applying for a loan to buy a specific property. Again, the preapproval amount typically only provides information regarding the overall mortgage amount and in and of itself does not necessarily provide adequate information for the borrower to make an informed decision.

Further, financial institutions typically calculate a buyer's maximum home loan amount based on set formulas. For example, the "28/36 rule" is commonly used to determine a maximum loan amount. This rule requires the buyer's "front-end ratio" to be no more than 28 percent. The front-end ratio equals monthly housing costs divided by gross monthly income. The monthly housing costs used in the formula include the principal and interest portion of the mortgage payment, as well as amounts to be deposited into escrow for additional items such as property taxes and insurance. The second part of the 28/36 rule requires the buyer's "back-end ratio" to be no more than 36 percent. The back-end ratio equals monthly housing costs and other monthly debt payments such as car loans, student loans, credit cards, child support, etc. divided by gross monthly income. The loan amount based on the 28/36 rule, however, may not be an amount the buyer is actually comfortable with. Even though the lender says the buyer may qualify for a certain loan amount based on the 28/36 rule, the buyer may not feel he or she could actually afford the monthly payment associated with that loan amount.

Aspects of the present disclosure are directed to systems and methods in which a "target price" is calculated for a buyer based on an analysis of financial information, which may identify a monthly payment amount or maximum loan amount for the buyer, which is not necessarily the same as the prequalification amounts generated by a lender based on predetermined formulas. Further, the borrower is provided the opportunity to modify the initially calculated target price amounts to arrive at desired, "comfortable" loan amounts. The target price amounts may then be saved to be used to provide customization and financial guidance scenarios associated with one or more selected properties. In this manner, the user information does not need to be re-entered multiple times as may be required with known generic home buying tools.

Specific implementations of the disclosed systems and methods include various modules configured for display on a mobile device that will allow users to customize their mobile experiences when searching for homes, finding a home mortgage consultant ("HMC"), calculating affordability, assessing mortgage options, etc. Some examples are implemented as mobile web sites, and are therefore available via mobile computing devices as well as desktop computing devices. This allows the user to save and retrieve, prefill and build scenarios for a single property or multiple scenarios for multiple properties. Some existing home buying and mortgage tools are implemented as mobile applications ("apps"), rather than as mobile web site. Generally, a mobile website is designed specifically for smaller screens and touch-screen capabilities of smaller, mobile devices such as smartphones and tablets. Rather than requiring installation of a specific mobile app, a mobile web site can be accessed using any mobile device's web browser, such as Safari or Chrome.

FIG. 1 illustrates various aspects of an example of a system in accordance with the present disclosure. The system 100 includes a computing system 102 that implements an analysis engine 104. The analysis engine 104 receives financial information regarding a user from a database 110, and/or from a user interface 120 displayed on a user device 122.

The user interface 110 may include, for example, input devices such as a keyboard, a mouse, a pen, a sound or voice input device, a touch or swipe input device, etc. An output device such as a display screen is further included. In some examples, the user device 122 is a mobile device such as a smartphone or tablet computer that communicates with the computing system 102 over a network such as the internet. The user device 122 receives and displays user interface displays 120 generated by the analysis engine 102. The user device 122 further receives information from a user through the user interface 120 via a touch screen input, for example. However, in other embodiments the user interface could be implemented via components local to the analysis engine 104, or by other devices remote therefrom and connectable by a network such as the internet. Any suitable device, such as, for example, a mobile telephone, a smart phone, a tablet personal computer, a laptop computer, a desktop computer, and the like that are connectable to the computing system 102 could implement the user interface 120.

In some examples, the computing system 102 is a server computer at a financial institution, such as a bank or mortgage company, that implements various components of the system 100, including the analysis engine 104. Further, the system 100 may be implemented by one or more computer systems. The database(s) 110 could be a local component of the server 102, or they could be accessible by the analysis engine 104 over a network such as a business computing network or the internet. The database 110 could be implemented by a single database or multiple databases 110a, 110b that are accessible by the server system 102. For example, one or more databases 110 could be internal to a financial institution or could be external thereto, such as databases for other banks, government agencies, employers, real estate listing companies, etc.

The analysis engine 104 receives financial information regarding a user, which is used to calculate a target home price for the user. In some examples, the analysis engine 104 applies the received information to predetermined rules 106 to calculate the target home price. As used herein, the target price generally defines financial amounts associated with a home purchase or refinance that are affordable or comfortable, for the user. As noted above, lenders typically calculate maximum loan and monthly payment amounts based on certain rules, such as the 28/36 rule. The target price amounts typically are lower than respective maximums calculated by financial institutions. For example, the target price typically includes a monthly mortgage payment amount that is calculated to include all components of a monthly payment, including principal and interest amounts as well as taxes, insurance, etc. The target price monthly payment amount typically is less than the monthly payment amount calculated based on the 28/36 rule.

The analysis engine generates a user interface 120 that displays a recommended monthly payment amount calculated for the user, which is received and displayed by the user device 122. Further, the analysis engine 104 receives modifications to the recommended monthly payment amount from the user via the user interface 120 displayed on the user device 122. In this manner, the user may adjust the initially-calculated recommended payment amount and/or inputs thereto to obtain an amount that the user feels is truly affordable, thus establishing the user's target price. The user may establish minimum and maximum payment amounts, raise or lower the suggested monthly payment, etc. in the process of creating the target price. Based on the user's established target price, the analysis engine 104 then evaluates homes for sale.

Figure 2:
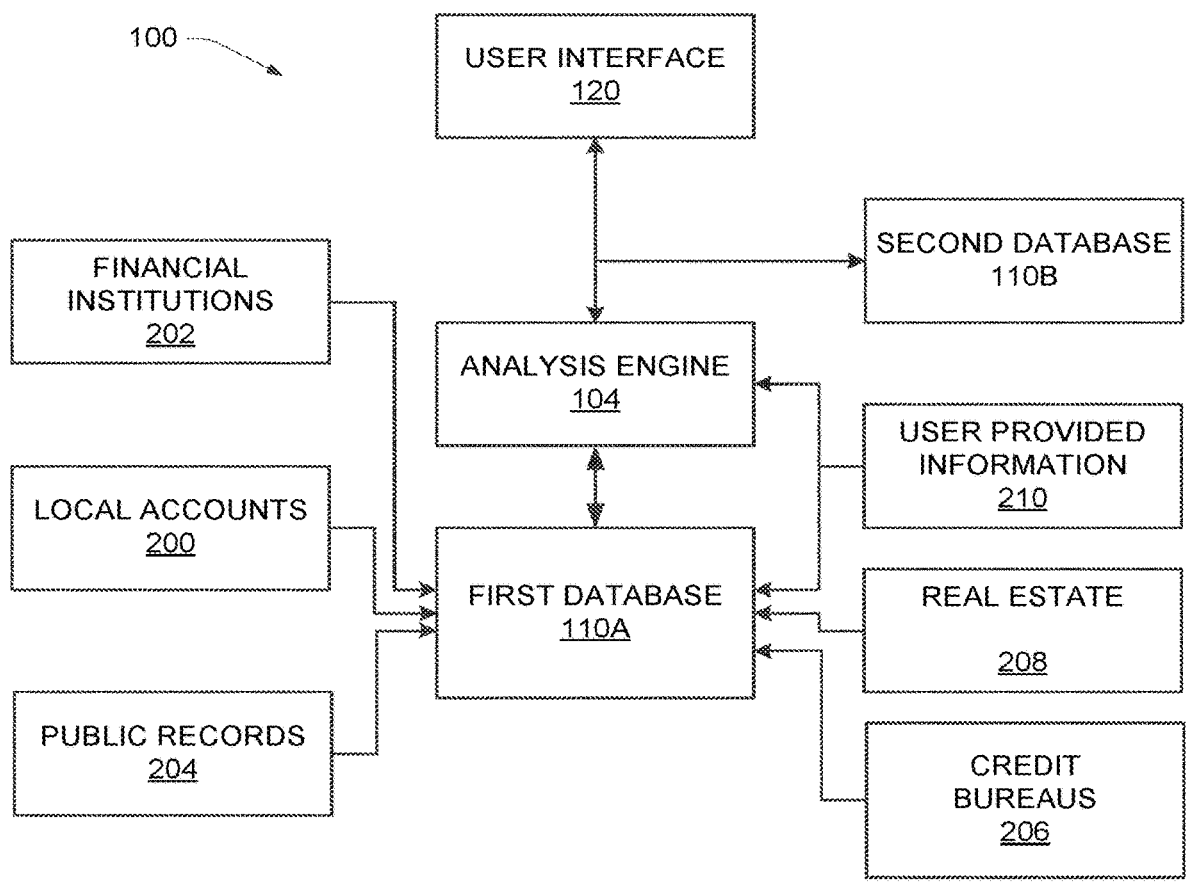
FIG. 2 is a block diagram illustrating examples of various information sources that may be accessed by the system illustrated in FIG. 1.

FIG. 2 illustrates examples of further aspects of the system 100 shown in FIG. 1. In some embodiments, the financial information used to calculate the initial target price is received from one or more databases 110. A financial information database 110A could receive and store information from various institutions, including local accounts 200 for the user, information from other financial institutions 202, public records 204, credit bureaus 206, real estate agencies 208, etc. In other implementations, the analysis engine 104 could directly access databases at information sources such as the examples depicted in FIG. 2. Alternatively, the information used to calculate the initial target price could be user provided financial information 210. The user provided information 210 could be received via the user interface 120, and/or retrieved from a database 110B storing the user provided information 210. Using data from sources such as the example data sources 200-210 shown in FIG. 2, rather than predetermined estimates or formulas for the target price calculations may result in more accurate results.

Figure 3:
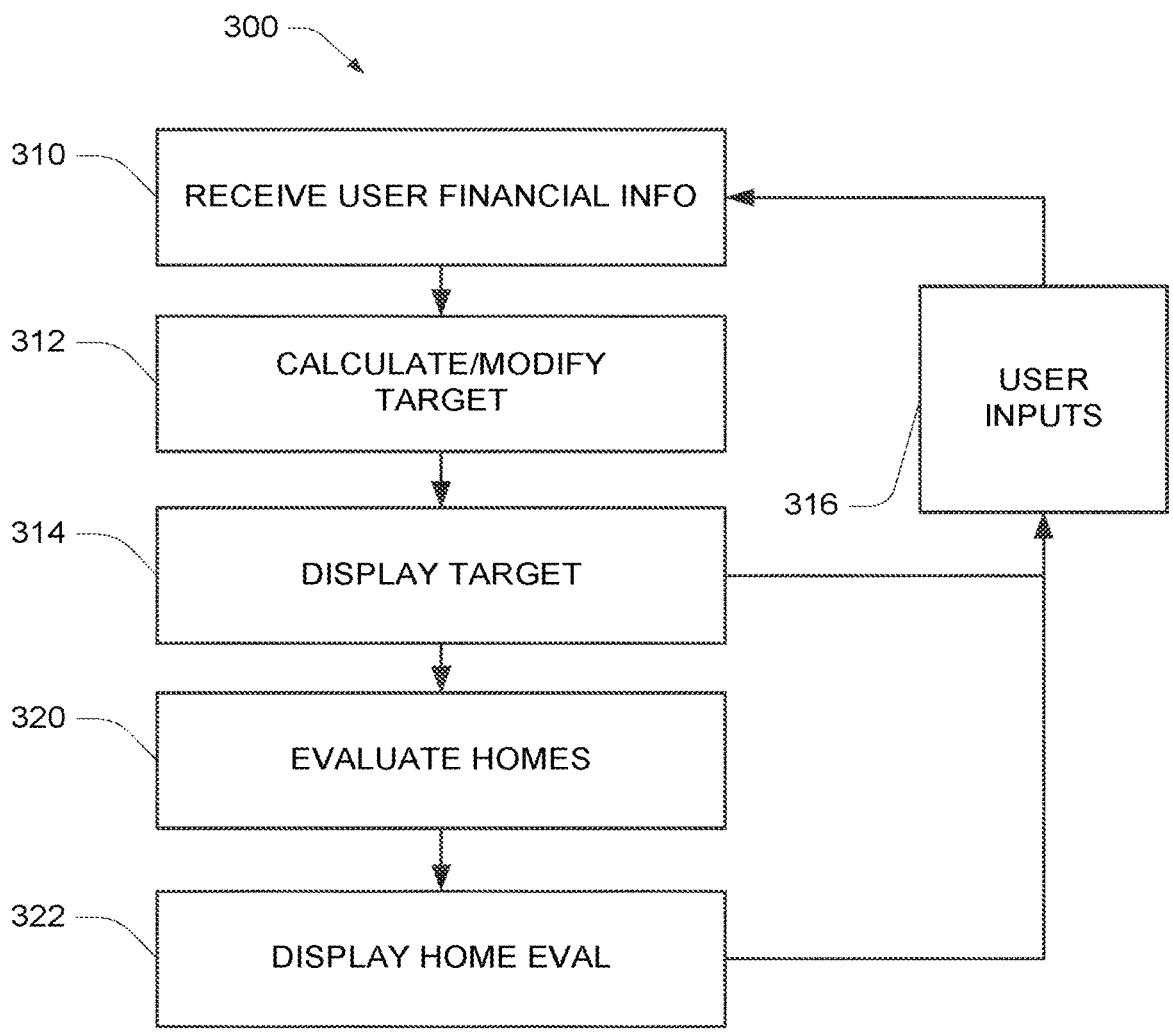
FIG. 3 is a flow diagram illustrating an example of a data analysis and display method executed by the system illustrated in FIG. 1.

FIG. 3 is a flow diagram generally illustrating an example of a process 300 executed by the analysis engine 104. As noted above, the analysis engine 104 receives user financial information as indicated in block 310. The user financial information received at block 310 could come directly from user inputs 316 via the user interface 120, or the information could be accessed from one or more databases. The financial information is used to calculate a recommended target price range in block 312, which is displayed on the user interface 120 in block 314. The calculated target home price range includes, for example, a target home purchase price and an associated target monthly payment. The user may then modify the displayed target amount and/or the associated financial information, providing user inputs 316 used to modify the target home price range in block 312, thus establishing the user's target price. The target price is then used to evaluate potential homes for the buyer at step 320, and this evaluation is displayed on the user interface 120 in block 322. The target price calculation is an iterative process in some implementations. For example, after viewing the home evaluation based on the target price, the user could provide further inputs 316 to the target price calculations to further refine the target price.

Figure 4:
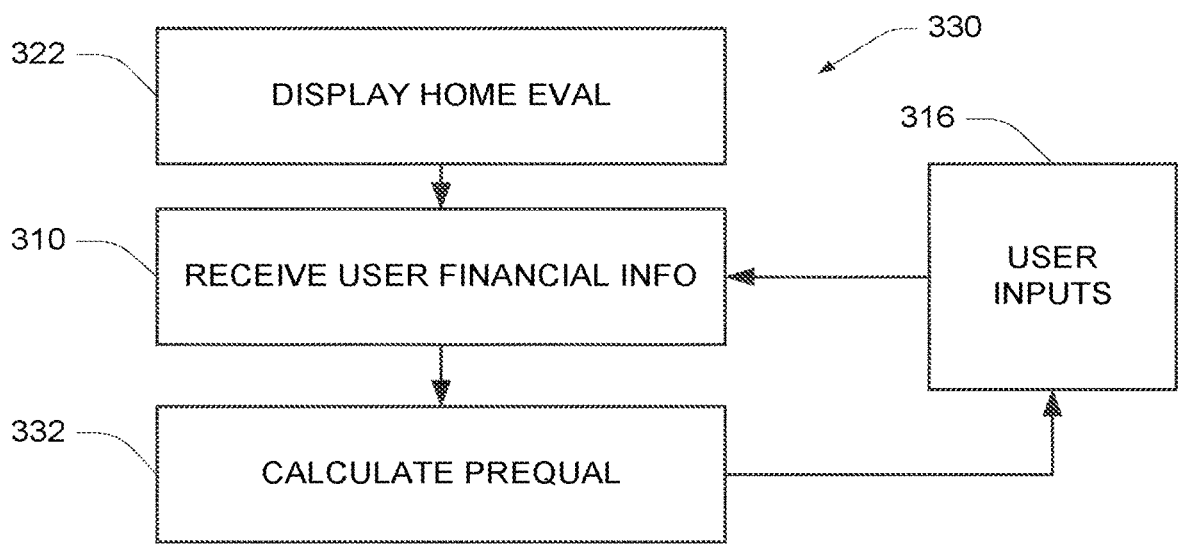
FIG. 4 is a flow diagram illustrating another example of a data analysis and display method executed by the system illustrated in FIG. 1.

FIG. 4 illustrates another process 330 implemented by the analysis engine in some embodiments. For example, once the user has reviewed the display of the home analysis 322, the user may decide to further the home buying process, for instance, by making an offer. It is useful for the buyer to have a prequalification certificate from a lender when negotiating with a seller. However, rather than generate a "generic" prequalification statement used for any selected property, the analysis engine 104 generates a prequalification certification for a particular property chosen based on the home evaluation displayed using the target price calculations. User financial information, such as the information received in block 322 may be used for the prequalification determination at step 332, as well as user input 316 provided via the user interface 120. More specifically, rather than generate a prequalification statement that identifies the user's maximum prequalification amount and providing this to the seller, the prequalification is tailored to the specific offer to be made.

Figure 5:
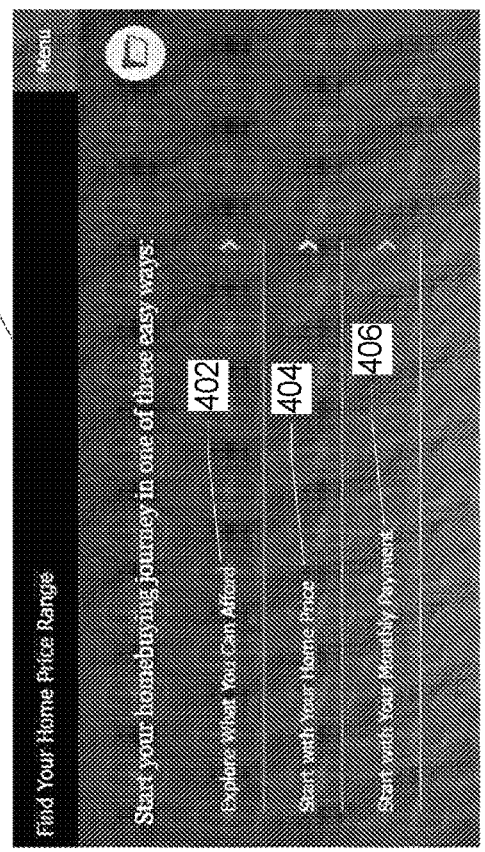
FIG. 5 illustrates an example of a target price estimator user interface display generated and displayed by the system illustrated in FIG. 1.

FIG. 5 is a screen shot illustrating an example target price estimator user interface 400 as displayed on a user device 120 such as a desktop or laptop computer, tablet device, smartphone, etc. The target home price estimator 400 allows the user to select among various options for calculating the target price. In the example shown in FIG. 5, the options include estimating the target price based on what the buyer can afford 402 ("Explore What You Can Afford"), a desired home purchase price 404 ("Start With Your Home Price"), or a desired monthly payment amount 406 ("Start With Your Monthly Payment").

Figure 6:
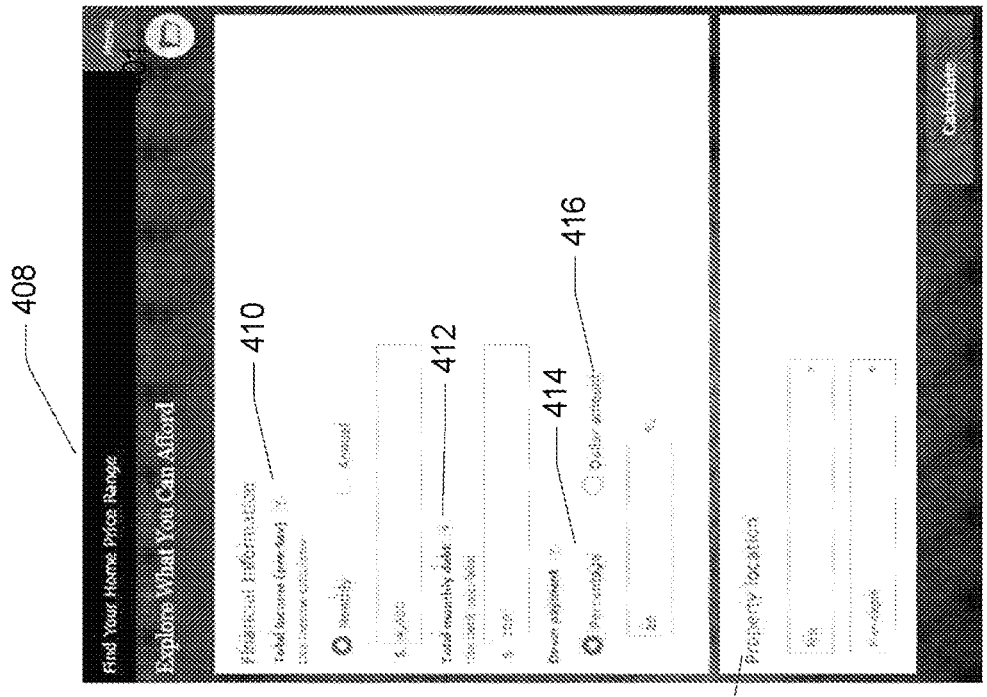
FIG. 6 illustrates an example of a user interface display generated and displayed in response to an input received in the user interface shown in FIG. 5.

FIG. 6 illustrates a user interface screen 408 displayed in response to the user selection for estimating the target price based on what the buyer fees he or she can afford 402. Financial information regarding the user is received through the user interface 408, including the user's total monthly or annual income 410, as well as monthly debt 412. A down payment amount is received, either as a percentage of the home purchase price 414 or as a dollar amount 416. Additionally, the illustrated example user interface 408 receives property location information 418, which may be used to access further information used for subsequent calculations. For example, the indicated property location information 418 may be used to access data from sources such as those shown in FIG. 2.

Figure 8:
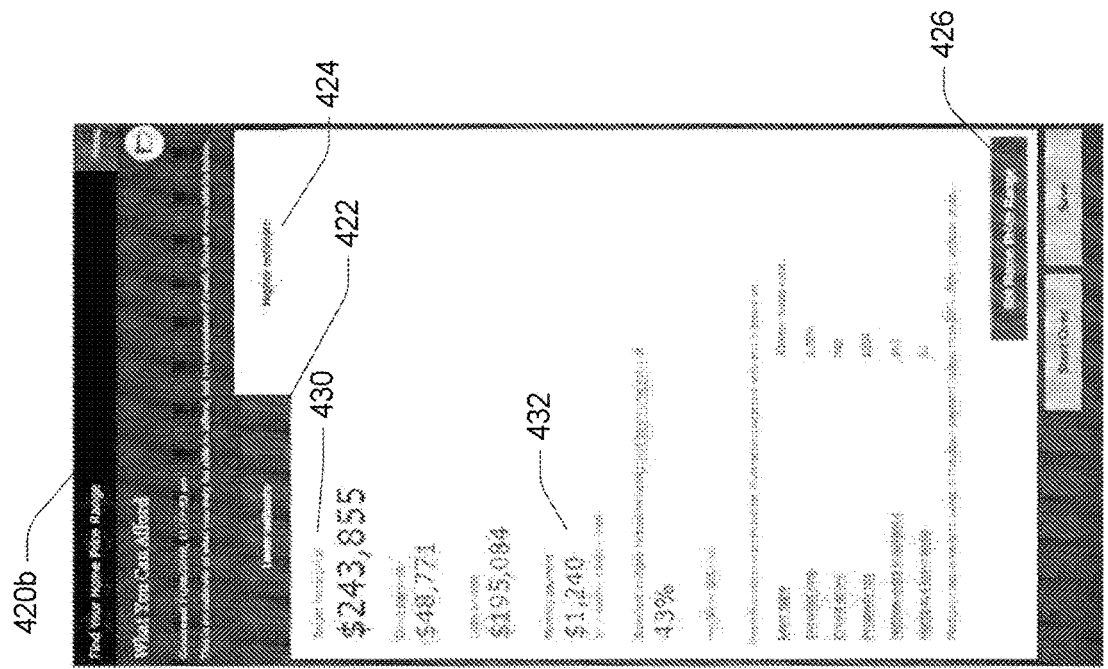
FIG. 8 illustrates an example of another user interface display generated and displayed in response to an input received in the user interface shown in FIG. 6.
Figure 7:
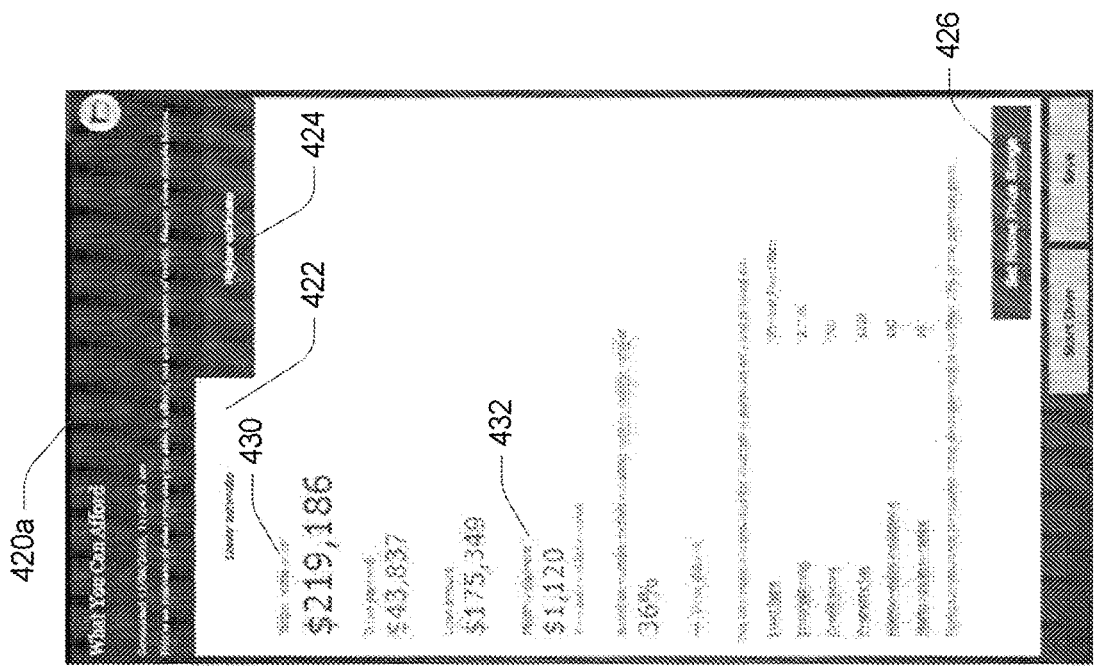
FIG. 7 illustrates an example of a user interface display generated and displayed in response to an input received in the user interface shown in FIG. 6.

FIG. 7 illustrates a user interface display 420a showing target home price information calculated based on received user information. The target price includes a target home purchase price 430 and a target monthly payment amount 432, as well as additional associated financial information, calculated based on financial information provided by the user and/or received from one or more financial institution databases. The user interface 420a in FIG. 7 shows lower target price information 422, including a first, or lower target home price 430 and payment 432. FIG. 8 shows a user interface 420b with higher range information 424, including a second, or higher target home price 430 and associated payment 432. The lower or higher target price information are displayed on the respective user interfaces 420a, 420b based on the user selection of the corresponding tabs 422, 424.

Figure 9:
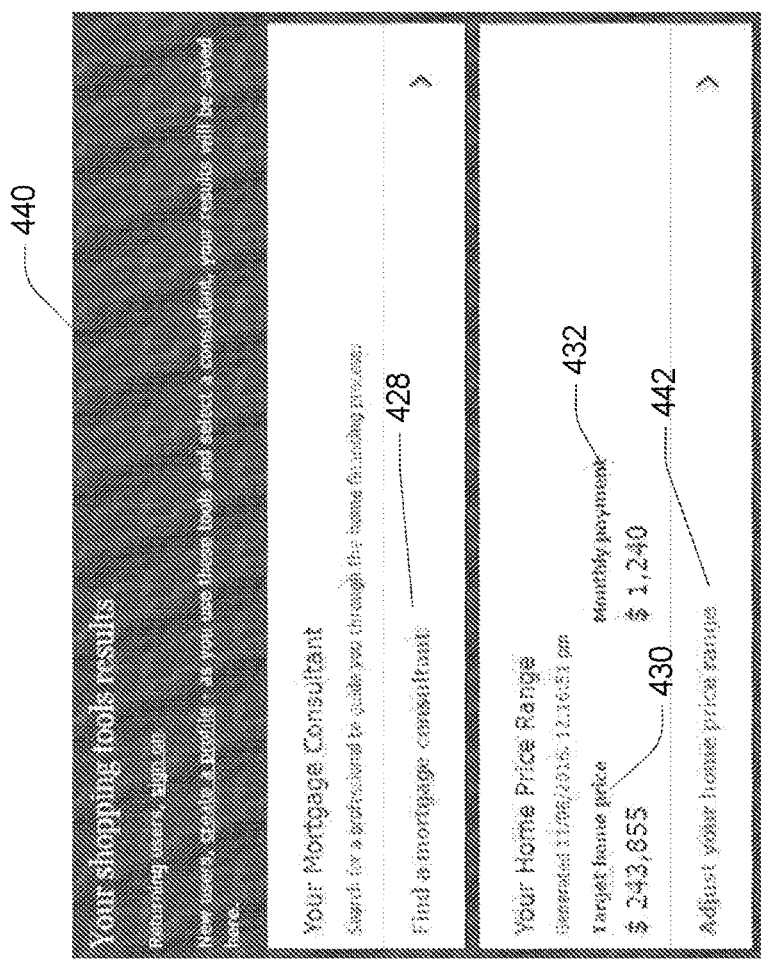
FIG. 9 illustrates an example of a user interface display generated and displayed in response to an input received in the user interface shown in FIG. 7 or 8.

The user interfaces 420a, 420b further include a selectable input 426, by which the user may set the desired target price information. In some examples, "setting" the target price with the input 426 results in saving the target price amounts to a database such as the database 110b shown in FIGS. 1 and 2 for future use by the user, eliminating the need for the user to go through the process of entering information multiple times. FIG. 9 illustrates an example of a user interface 440 displayed based on the user selection of the input 426. In the example shown in FIG. 9, the target price information is displayed for the user selection of the input 426 on the user interface 420b. Accordingly, the target home price 430 and associated monthly payment 432 information shown in FIG. 8 are again displayed on the user interface 440 shown in FIG. 9. The user interface 440 further includes a link 428 to allow the user to find a mortgage consultant to assist the user with loan information. The user interface 440 also includes a link 442 that allows the user to modify the calculated target home price range. In the illustrated example, the target price estimator user interface 400 shown in FIG. 5 is displayed in response to the user selection of the link 442. In this manner, the user may modify the target price using the desired option for estimating the target price based on what the buyer can afford 402 ("Explore What You Can Afford"), a desired home purchase price 404 ("Start With Your Home Price"), or a desired monthly payment amount 406 ("Start With Your Monthly Payment").

Figure 10:
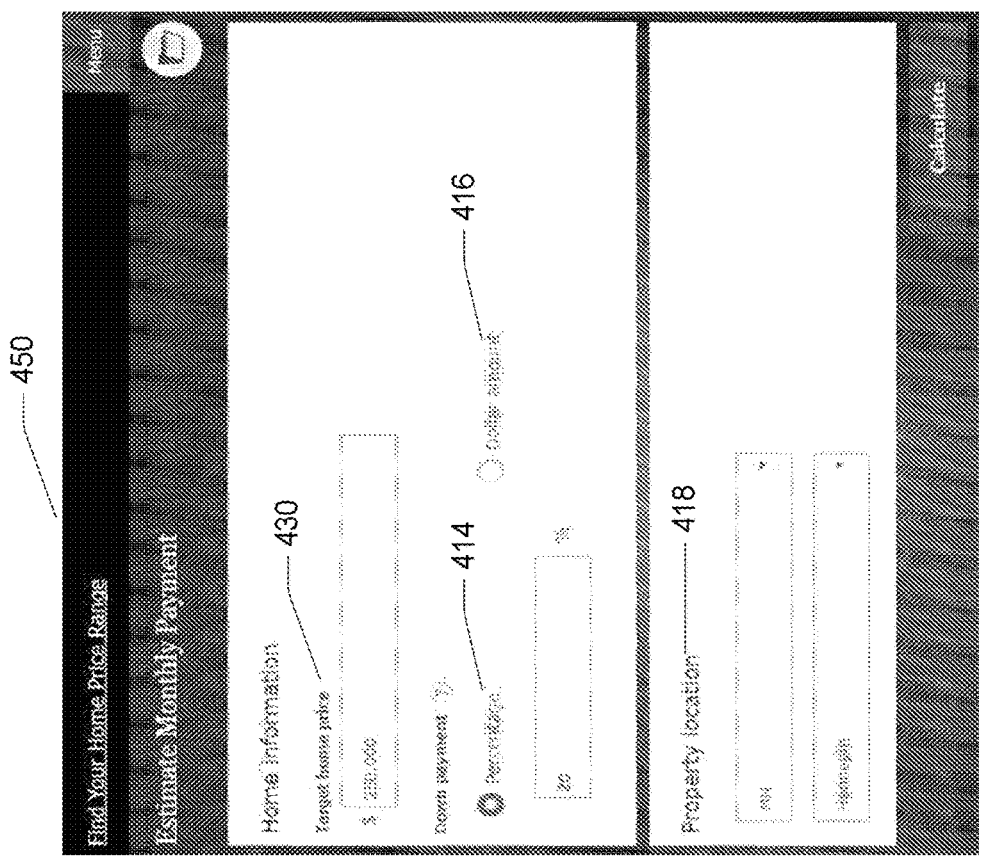
FIG. 10 illustrates an example of a user interface display generated and displayed in response to an input received in the user interface shown in FIG. 5.

FIG. 10 illustrates another user interface 450 that is displayed based on a user selection of the desired home purchase price option 404 ("Start With Your Home Price") in the user interface 400 shown in FIG. 5. Again, financial information regarding the user is received through the user interface 450, including the user's desired home purchase price 430. The desired down payment amount is received, either as a percentage of the home purchase price 414 or as a dollar amount 416. The user interface 450 receives property location information 418, which may be used to access further information used for subsequent calculations.

Figure 11:
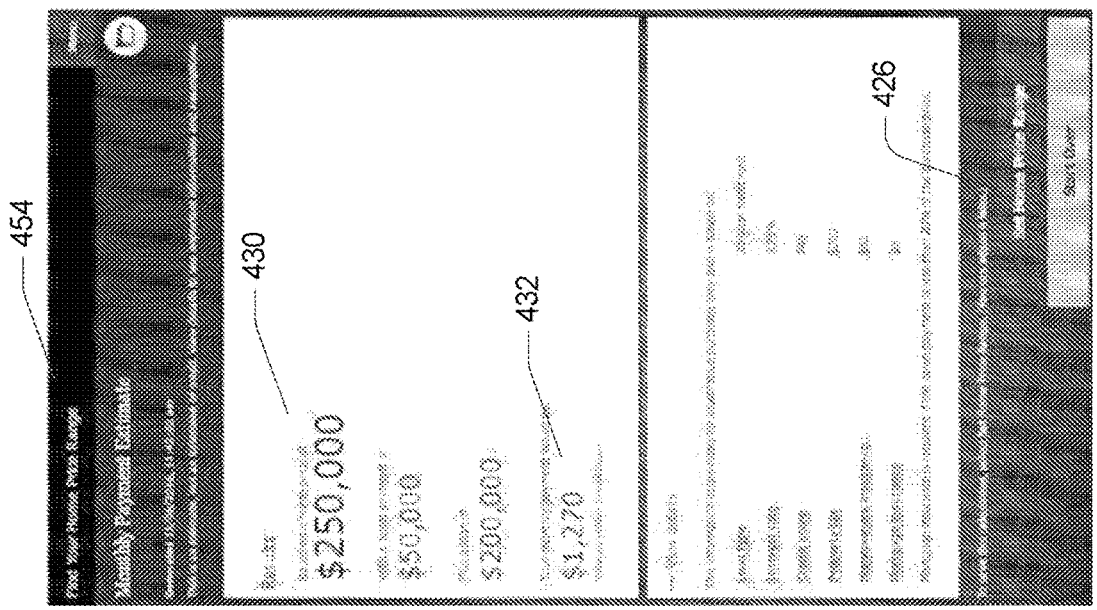
FIG. 11 illustrates an example of a user interface display generated and displayed in response to an input received in the user interface shown in FIG. 10.
Figure 12:
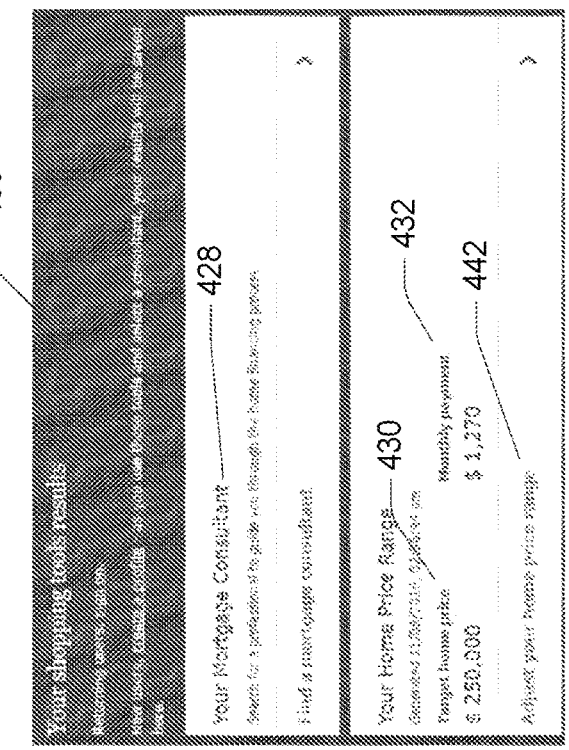
FIG. 12 illustrates an example of another user interface display generated and displayed in response to an input received in the user interface shown in FIG. 11.

FIG. 11 illustrates a user interface display 454 showing target home price information calculated based on received user information, including the information provided in the user interface 450. The target price includes the previously input home purchase price 430 and a monthly payment amount 432, as well as additional associated financial information, calculated based on financial information provided by the user and/or received from one or more financial institution databases. The user interface 454 further includes a selectable input 426, by which the user may set the desired target price information. FIG. 12 illustrates an example of a user interface 460 displayed based on the user selection of the input 426 of the user interface 454. The example shown in FIG. 12 includes the target home price 430 and associated monthly payment 432 information from in FIG. 11. The user interface 460 further includes the link 428 to allow the user to find a mortgage consultant to assist the user with loan information, and the link 442 that allows the user to modify the calculated target home price range.

Figure 13:
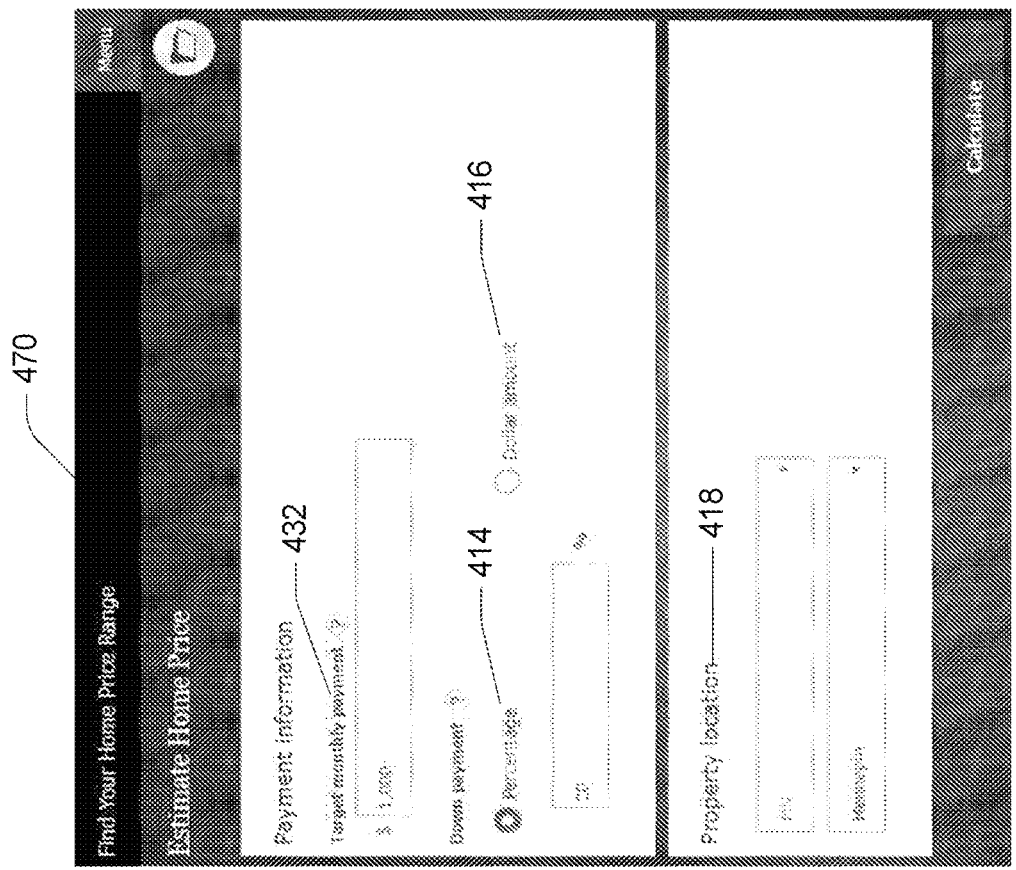
FIG. 13 illustrates an example of a user interface display generated and displayed in response to an input received in the user interface shown in FIG. 5.

The user may modify the target price by selecting the input 442 in FIG. 12. In response to selecting the link 442, the target price estimator user interface 400 shown in FIG. 5 is displayed. Selecting the option for estimating the target price based a desired monthly payment amount 406 ("Start With Your Monthly Payment") results in displaying the user interface 470 of FIG. 13. The user may enter a desired monthly payment 432 along with the desired down payment amount, either as a percentage of the home purchase price 414 or as a dollar amount 416. The user interface 470 receives property location information 418, which may be used to access further information used for subsequent calculations.

Figure 14:
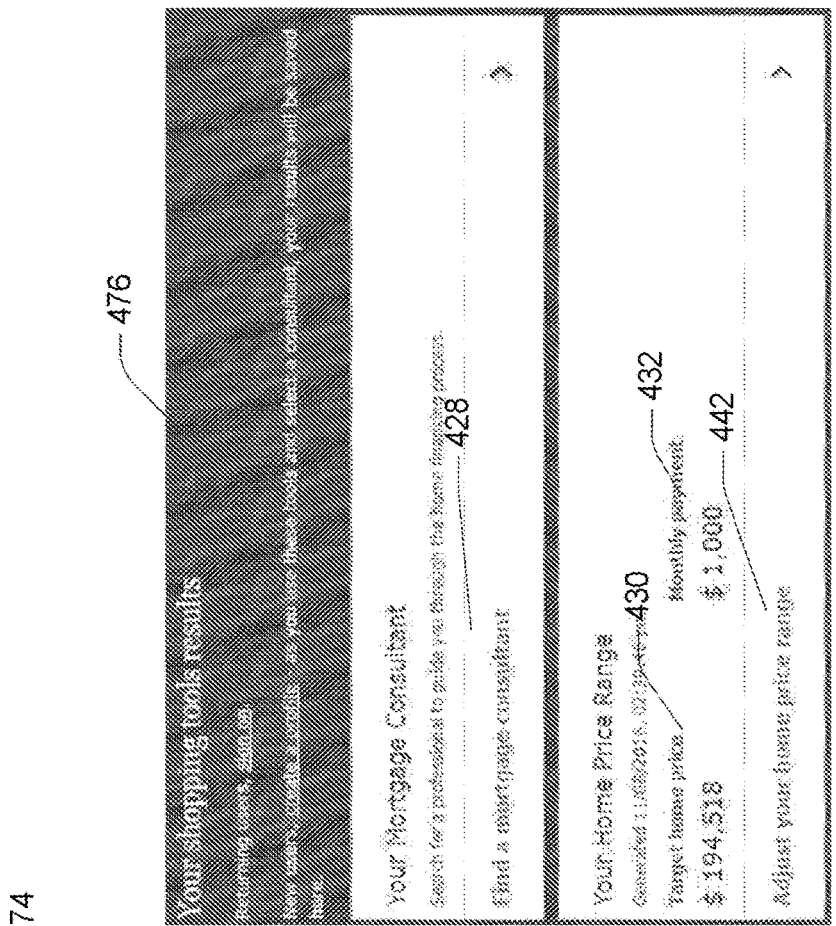
FIG. 14 illustrates an example of a user interface display generated and displayed in response to an input received in the user interface shown in FIG. 13.
Figure 15:
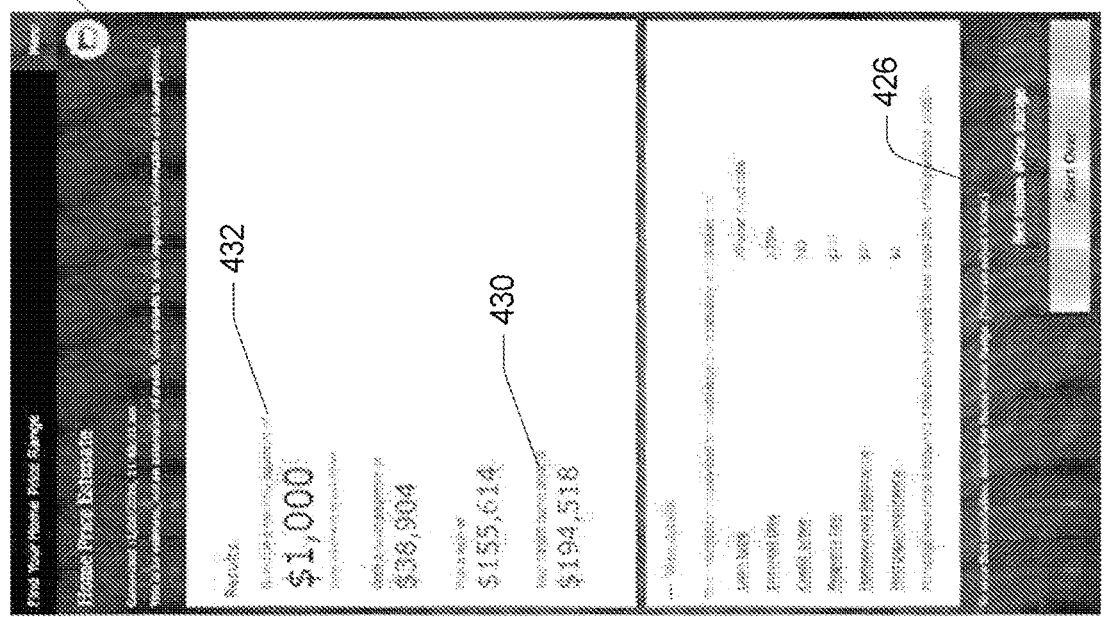
FIG. 15 illustrates an example of another user interface display generated and displayed in response to an input received in the user interface shown in FIG. 14.

FIG. 14 illustrates a user interface display 474 showing target home price information calculated based on received user information, including the information provided in the user interface 470 shown in FIG. 12. The target price includes the home purchase price 430 and the monthly payment amount 432, as well as additional associated financial information, calculated based on financial information provided by the user and/or received from one or more financial institution databases. The user interface 474 further includes a selectable input 426, by which the user may set the desired target price information. FIG. 15 illustrates an example of a user interface 476 displayed based on the user selection of the input 426. The example shown in FIG. 14 includes the target home price 430 and associated monthly payment 432 information shown in FIG. 14. The user interface 476 further includes the link 428 to allow the user to find a mortgage consultant to assist the user with loan information, and the link 442 that allows the user to modify the calculated target home price range. In the illustrated example, the target price estimator user interface 400 shown in FIG. 5 is displayed in response to the user selection of the link 442. In this manner, the user may modify the target price using the desired option for include estimating the target price based on what the buyer can afford 402 ("Explore What You Can Afford"), a desired home purchase price 404 ("Start With Your Home Price"), or a desired monthly payment amount 406 ("Start With Your Monthly Payment").

FIG. 16 illustrates an example of an alternative user interface 500 which may be displayed on a user device 120. The user interface 500 shows an alternative target price estimator in which a monthly payment amount 510 is calculated and displayed based on user financial information received from one or more financial institution databases, and/or information provided by the user. The user interface 500 include a user input device that allows the user to modify the user information or the calculated monthly payment amount 510. In the example shown in FIG. 16, slide bars 512 are provided on the user interface 500 for this purpose. Other input devices may be provided, such as dials, input boxes, dropdown menus, etc. In this manner, the user may adjust the recommended monthly payment up or down, establish a minimum and/or maximum payment, etc. to modify the target price information.

FIG. 17 illustrates another user interface display 501, in which additional target price calculations are displayed. In addition to the monthly payment amount 510, the user display 501 displays a calculated total home price 514 and the user's remaining savings amount 518 based on a given down payment amount 516. As with the user interface 500, sliders 512 are provided that allow the user to modify the user information and/or the calculated amounts.

Figures 18, 19:
FIG. 18 illustrates another example of a target price estimator user interface display generated and displayed by the system illustrated in FIG. 1.
FIG. 19 illustrates an example of a home analysis user interface display generated and displayed by the system illustrated in FIG. 1.

Once the displayed target price amounts are satisfactory to the user, the user may finalize the target price amounts by activating the input 522 shown in the user interface display 503 illustrated in FIG. 18. In some examples, "setting" the target price further results in saving the target price amounts to a database such as the database 110b shown in FIGS. 1 and 2 for future use by the user, eliminating the need for the user to go through the process of entering information multiple times.

The target price amounts may be used by the analysis engine 104 to evaluate potential homes for purchase by the user. In some examples, the analysis engine 104 receives information from home searching applications, multiple listing services ("MLS"), real estate agencies, photo search sites, etc., that provide information regarding homes for sale. The analysis engine 104 may then evaluate one or more listed properties based on the user's target price to determine their "fit" for the user. For example, FIG. 19 illustrates a "map view" user interface display 530 based on the home analysis. In the user interface 530, for sale properties are shown on a map, with properties that fit the target price amounts (for example, purchase price, monthly payment amount, etc. are below the target price maximum amount) shown in a first indicator 533 having a first color such as green, while other properties that do not fit the target price or possibly fit only some aspects of the target price are highlighted with a second indicator 534 in another color such as red.

Figure 21:
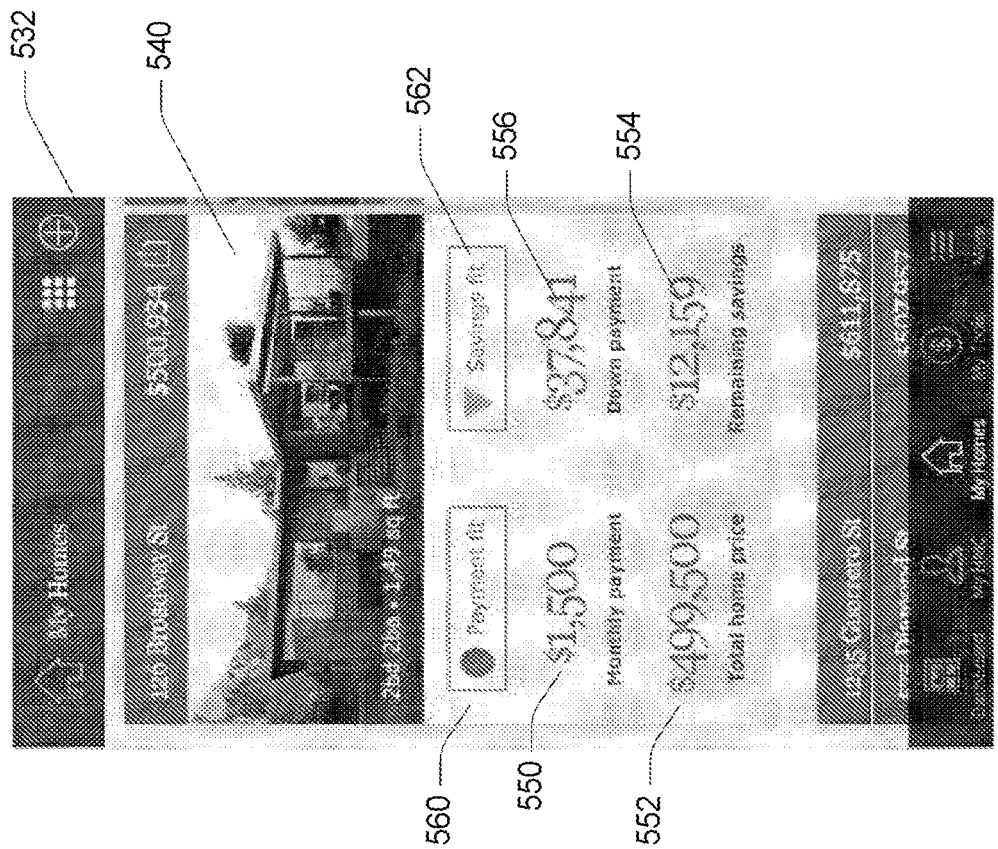
FIG. 21 illustrates another example of a home analysis user interface display generated and displayed by the system illustrated in FIG. 1.
Figure 20:
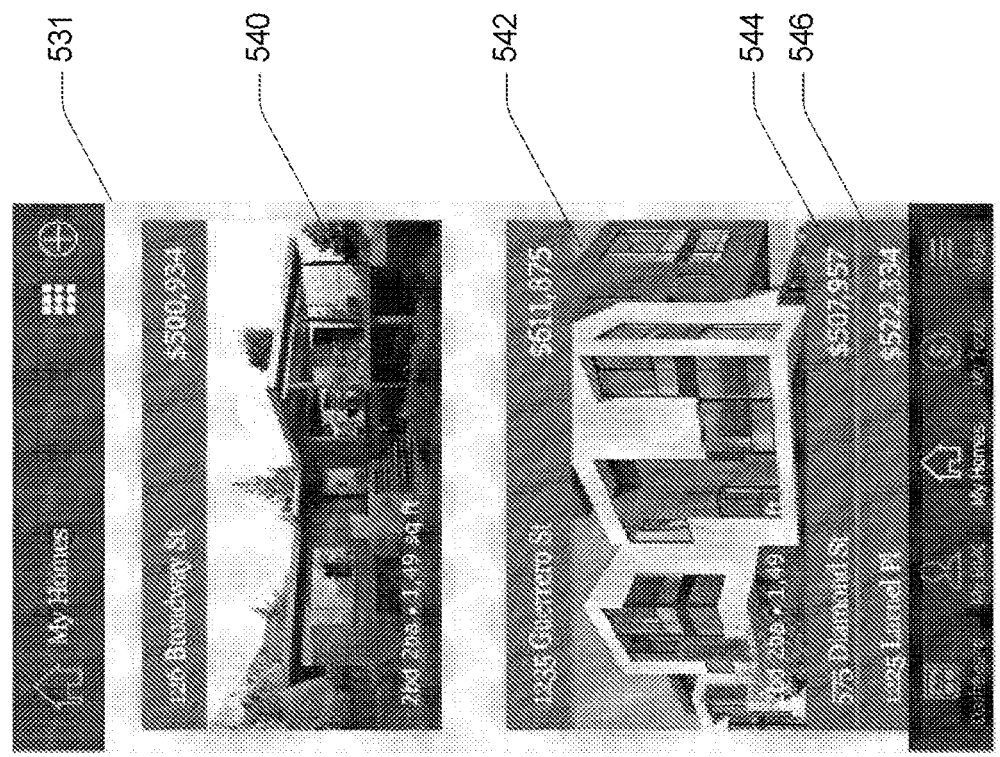
FIG. 20 illustrates another example of a home analysis user interface display generated and displayed by the system illustrated in FIG. 1.

FIG. 20 illustrates another example user interface display 531, in which a list of analyzed properties 540-546 is displayed. Upon selection of one of the properties 540 by a user, financial amounts associated with the selected property 540 are displayed as shown in the user interface 532 illustrated in FIG. 21. In the user interface 532, a monthly payment 550, total home price 552, and savings remaining 554 based on a down payment amount 556 are displayed, which correspond to the target price amounts the various user displays illustrated in the examples shown previously. Additionally, a payment fit 560 display and savings fit 562 display on the user interface 532 provide the user with information as to affordability of the selected property based on the user's target price amounts. The displayed amounts 550-554 may be modified based on the user's selection of available mortgage options, such as different mortgage terms, interest rates, etc.

Moreover, in conducting the property analysis, the analysis engine 104 may use financial information obtained from various sources such as the information sources 200-210 shown in FIG. 2. This may provide a more accurate analysis of for sale properties, and also provide a better indication of the property fit relative to the user's target price. For instance, rather than simple estimating the property tax portion of the displayed monthly payment based on a predetermined percentage of the sale price, actual property tax information may be obtained from public records 204 for use by the analysis engine 104. Similarly, rather than simply estimating a user's monthly installment loan obligations, local accounts 200 may be accessed if the user is an existing customer of the lender, or financial information from other financial institutions 202 may be obtained.

The user may desire to receive further mortgage information, and/or receive a prequalification certificate from a potential lender. Using information generated by the analysis engine 104 and the selected property such as that shown in the user interface 532 of FIG. 21, the analysis engine may further provide mortgage calculations and generate a user display for a prequalification certification.

Figure 23:
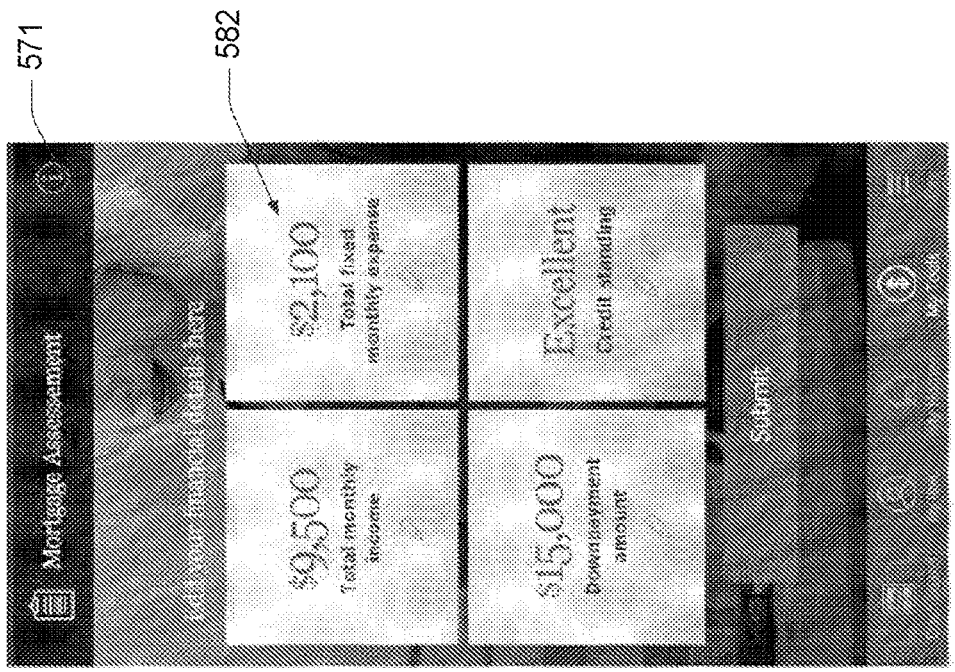
FIG. 23 illustrates another example of a mortgage prequalification user interface display generated and displayed by the system illustrated in FIG. 1.
Figure 22:
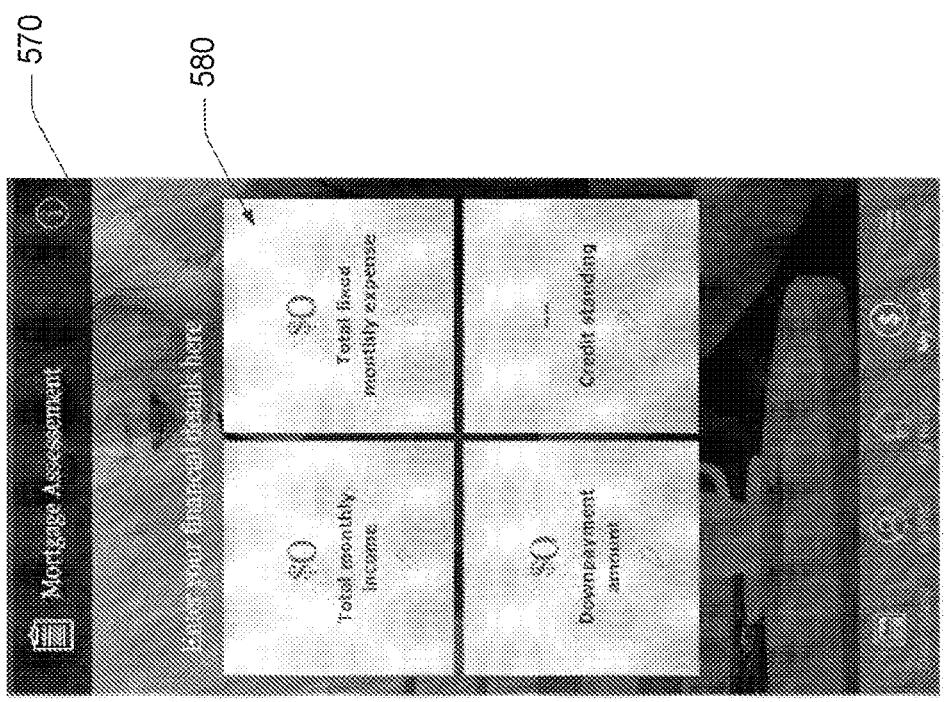
FIG. 22 illustrates an example of a mortgage prequalification user interface display generated and displayed by the system illustrated in FIG. 1.

FIG. 22 shows an example of a user interface display 570 for receiving user financial information. The user interface 570 includes user inputs 580 in which the user may provide the necessary financial details. FIG. 23 illustrates another user interface 571, in which further user inputs 582 are displayed to receive edits to the financial information received in the user inputs 580 of the user interface 570. In some embodiments, the user information previously provided for the target price calculations is used, rather than information provided via the inputs 580. In such examples, the previously received information would be displayed in the user input areas 580 for editing by the user.

Figure 24:
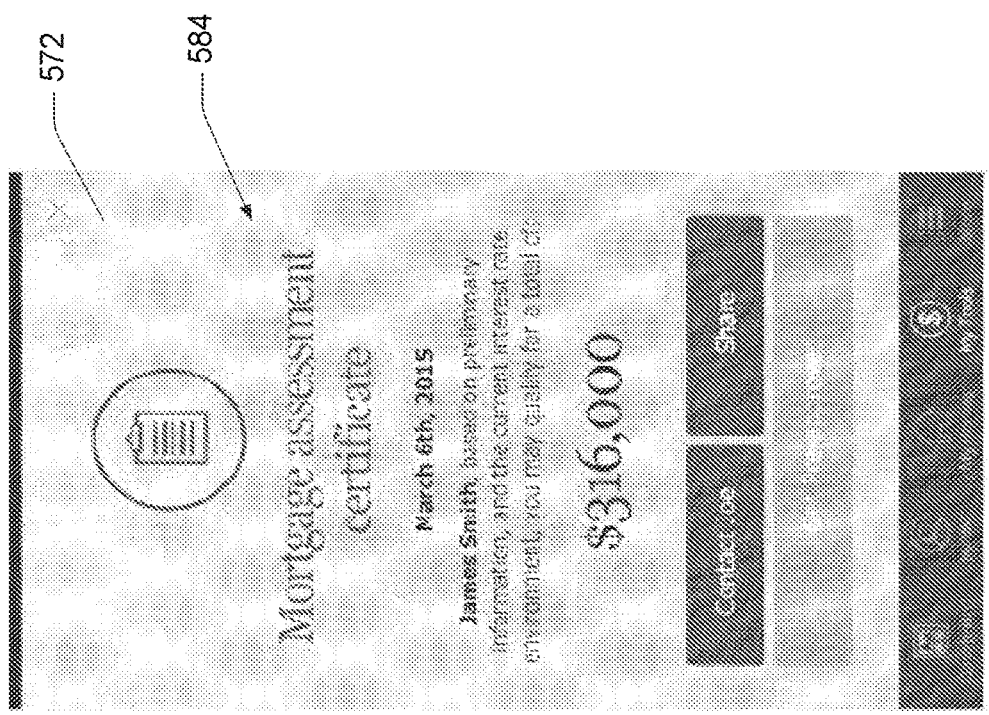
FIG. 24 illustrates another example of a mortgage prequalification user interface display generated and displayed by the system illustrated in FIG. 1.

FIG. 24 illustrates an example of a user interface 572 providing a mortgage prequalification certificate 584 based on the user information received and edited in the user interfaces 570, 571 illustrated in FIGS. 11 and 12. Typically, additional financial information is additionally used in calculating the prequalification amount shown in the certificate 584, such as credit score, types of monthly expenses, bankruptcy history, etc. Such information may be obtained from the user via additional user interfaces generated by the analysis engine 104 and displayed on the user device 122, and/or from financial information received from one or more databases 110. In some examples, the prequalification certificate 584 displays a total prequalification amount that is not necessarily the maximum amount the user could qualify for. Instead, the amount shown corresponds to the target purchase price determined earlier.

FIG. 25 schematically illustrates an example a computer system 102 suitable for implementing the analysis engine 104. In some implementations, the computer 102 is a server computer 102 for a financial institution. The computer 102 includes at least one central processing unit ("CPU") 602, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the server computer 600, such as during startup, is stored in the ROM 612. The computer 102 further includes a mass storage device 614. The mass storage device 614 is able to store software instructions and data. As noted above, one or more of the databases 110 could be implemented by the mass storage device 612, or one or more of the databases 110 could be implemented by other computer systems accessible by the computer 102.

The mass storage device 614 is connected to the CPU 602 through a mass storage controller (not shown) connected to the system bus 622. The mass storage device 614 and its associated computer-readable data storage media provide non-volatile, non-transitory storage for the server computer 600. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 600.

According to various embodiments of the invention, the server computer 102 may operate in a networked environment using logical connections to remote network devices through the network 620, such as a wireless network, the Internet, or another type of network. The server computer 102 may connect to the network 620 through a network interface unit 604 connected to the system bus 622. It should be appreciated that the network interface unit 604 may also be utilized to connect to other types of networks and remote computing systems. The server computer 102 also includes an input/output controller 606 for receiving and processing input from a number of other devices, which could include the user interface 120, which could include a touch user interface display screen, or another type of input device. Similarly, the input/output controller 606 may provide output to a touch user interface display screen or other type of output device.

As mentioned briefly above, the mass storage device 614 and the RAM 610 of the server computer 102 can store software instructions and data. The software instructions include an operating system 618 suitable for controlling the operation of the server computer 600, and software applications 616. The mass storage device 614 and/or the RAM 610 also store software instructions, that when executed by the CPU 602, cause the server computer 102 to provide the functionality of the server computer 102 discussed in this document, including the analysis engine 104. For example, the mass storage device 614 and/or the RAM 610 can store software instructions that, when executed by the CPU 602, cause the server computer 102 to implement the analysis engine 104 shown in FIG. 1.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer implemented method, comprising:
   displaying, using an interactive graphical display, a target home price calculator interface including:
      a first interactive graphical element for selecting a first target home price calculation option based on a first parameter;
      a second interactive graphical element for selecting a second target home price calculation option based on a second parameter that is different from the first parameter; and
      a third interactive graphical element for selecting a third target home purchase calculation option based on a third parameter that is different from the first parameter and the second parameter;
   displaying, using the interactive graphical display, financial information regarding a user, wherein:
      in response to a selection, using the interactive graphical display, of the first interactive graphical element, the financial information includes information related to the first parameter;
      in response to a selection, using the interactive graphical display, of the second interactive graphical element, the financial information includes information related to the second user parameter;
      in response to a selection, using the interactive graphical display, of the third interactive graphical element, the financial information includes information related to the third parameter;
   calculating a target home price based on the financial information;
   generating a target home price adjustment interface that displays, using the interactive graphical display, the target home price, a savings slide bar having a savings slider for adjusting a savings amount, and a down payment slide bar having a down payment slider for adjusting a down payment amount; and
   receiving, subsequent to the generating, a modification to the target home price to provide a modified target home price, the modification being provided via a sliding adjustment of at least one of the savings slider and the down payment slider using the interactive graphical display.

2. The method of claim 1, wherein the first parameter is user affordability, the second parameter is user desired home purchase price, and the third parameter is user desired monthly payment.

3. The method of claim 1, wherein the modification to the target home price is provided via sliding adjustments of the savings slider and the downpayment slider.

4. The method of claim 1, wherein the modification to the target home price is provided, in part, via a sliding adjustment of a monthly gross income slider displayed using the interactive graphical display to adjust a monthly gross income.

5. The method of claim 1, wherein the modification to the target home price is provided, in part, via a sliding adjustment of a monthly debt expense slider displayed using the interactive graphical display to adjust a monthly debt expense.

6. The method of claim 1, wherein the modification to the target home price is provided, in part, via a sliding adjustment of a monthly gross mortgage payment slider displayed using the interactive graphical display to adjust a monthly mortgage payment.

7. The method of claim 1, further comprising receiving a selection, via the interactive graphical display, of a set target button to set a modified target home price.

8. The method of claim 1, further comprising:
   calculating a prequalification certificate based on the financial information; and
   displaying the prequalification certificate using the interactive graphical display.

9. An information analysis and display system, comprising:
   an interactive graphical display; and
   a computing subsystem configured to perform the actions of:
      displaying, using the interactive graphical display, a target home price calculator interface including:
         a first interactive graphical element for selecting a first target home price calculation option based on a first parameter;
         a second interactive graphical element for selecting a second target home price calculation option based on a second parameter that is different from the first parameter; and
         a third interactive graphical element for selecting a third target home purchase calculation option based on a third parameter that is different from the first parameter and the second parameter;
      displaying, using the interactive graphical display, financial information regarding a user, wherein:
         in response to a selection, using the interactive graphical display, of the first interactive graphical element, the financial information includes information related to the first parameter;
         in response to a selection, using the interactive graphical display, of the second interactive graphical element, the financial information includes information related to the second user parameter;

in response to a selection, using the interactive graphical display, of the third interactive graphical element, the financial information includes information related to the third parameter;

calculating a target home price based on the financial information;

generating a target home price adjustment interface that displays, using the interactive graphical display, the target home price, a savings slide bar having a savings slider for adjusting a savings amount, and a down payment slide bar having a down payment slider for adjusting a down payment amount; and receiving, subsequent to the generating, a modification to the target home price to provide a modified target home price, the modification being provided via a sliding adjustment of at least one of the savings slider and the down payment slider using the interactive graphical display.

10. The system of claim 9, wherein the first parameter is user affordability, the second parameter is user desired home purchase price, and the third parameter is user desired monthly payment.

11. The system of claim 9, wherein the modification to the target home price is provided via sliding adjustments of the savings slider and the downpayment slider.

12. The system of claim 9, wherein the modification to the target home price is provided, in part, via a sliding adjustment of a monthly gross income slider displayed using the interactive graphical display to adjust a monthly gross income.

13. The system of claim 9, wherein the modification to the target home price is provided, in part, via a sliding adjustment of a monthly debt expense slider displayed using the interactive graphical display to adjust a monthly debt expense.

14. The system of claim 9, wherein the modification to the target home price is provided, in part, via a sliding adjustment of a monthly gross mortgage payment slider displayed using the interactive graphical display to adjust a monthly mortgage payment.

15. The system of claim 9, wherein the computer subsystem is further configured to perform the action of:

receiving a selection, via the interactive graphical display, of a set target button to set a modified target home price.

16. The system of claim 9, wherein the computer subsystem is further configured to perform the actions of:

calculating a prequalification certificate based on the financial information; and displaying the prequalification certificate using the interactive graphical display.

17. A non-transitory computer-readable data storage medium storing instructions that, when executed by a computing system, implement a method comprising:

displaying, using an interactive graphical display, a target home price calculator interface including:

a first interactive graphical element for selecting a first target home price calculation option based on a first parameter;

a second interactive graphical element for selecting a second target home price calculation option based on a second parameter that is different from the first parameter; and a third interactive graphical element for selecting a third target home purchase calculation option based on a third parameter that is different from the first parameter and the second parameter;

displaying, using the interactive graphical display, financial information regarding a user, wherein:

in response to a selection, using the interactive graphical display, of the first interactive graphical element, the financial information includes information related to the first parameter;

in response to a selection, using the interactive graphical display, of the second interactive graphical element, the financial information includes information related to the second user parameter;

in response to a selection, using the interactive graphical display, of the third interactive graphical element, the financial information includes information related to the third parameter;

calculating a target home price based on the financial information;

generating a target home price adjustment interface that displays, using the interactive graphical display, the target home price, a savings slide bar having a savings slider for adjusting a savings amount, and a down payment slide bar having a down payment slider for adjusting a down payment amount; and receiving, subsequent to the generating, a modification to the target home price to provide a modified target home price, the modification being provided via a sliding adjustment of the savings slider and the down payment slider using the interactive graphical display.

18. The non-transitory computer-readable data storage medium of claim 17, wherein the first parameter is user affordability, the second parameter is user desired home purchase price, and the third parameter is user desired monthly payment.

19. The non-transitory computer-readable data storage medium of claim 17, wherein the modification to the target home price is provided, in part, via:

a sliding adjustment of a monthly gross income slider displayed using the interactive graphical display to adjust a monthly gross income;

a sliding adjustment of a monthly debt expense slider displayed using the interactive graphical display to adjust a monthly debt expense; and a sliding adjustment of a monthly gross mortgage payment slider displayed using the interactive graphical display to adjust a monthly mortgage payment.

20. The non-transitory computer-readable data storage medium of claim 19, wherein the implemented method includes, subsequent to receiving the modification to the target home price, receiving a selection, via the interactive graphical display, of a set target button to set a modified target home price.

* * * * *

UNITED STATES PATENT AND TRADEMARK OFFICE
CERTIFICATE OF CORRECTION

PATENT NO. : 11,315,203 B1
APPLICATION NO. : 17/064297
DATED : April 26, 2022
INVENTOR(S) : O'Neal et al.

It is certified that error appears in the above-identified patent and that said Letters Patent is hereby corrected as shown below:

On the Title Page

Page 2, Column 1 item (56) (Other Publications), Line 6: delete "Four" and insert --Your--

Page 2, Column 1 item (56) (Other Publications), Line 8: delete "sawy" and insert --savvy--

Page 2, Column 1 item (56) (Other Publications), Line 14: delete "https://webarchiveorg/" and insert --https://web.archive.org/--

Page 2, Column 1 item (56) (Other Publications), Line 15: delete "/http:/fwww_" and insert --/http://www.--

In the Claims

Column 12, Line 18, Claim 3: delete "downpayment" and insert --down payment--

Column 13, Line 27, Claim 11: delete "downpayment" and insert --down payment--

Signed and Sealed this
Twentieth Day of September, 2022

*Katherine Kelly Vidal*

Katherine Kelly Vidal
*Director of the United States Patent and Trademark Office*